United States Patent [19]

Leussler et al.

[11] Patent Number: 5,037,913

[45] Date of Patent: Aug. 6, 1991

[54] HYDROXYLATED ACRYLIC COPOLYMER BINDER FOR PAINTS

[75] Inventors: Philipp Leussler; Francisco B. Vinallonga, both of Barcelona, Spain

[73] Assignee: Albus S.A., Barcelona, Spain

[21] Appl. No.: 469,676

[22] Filed: Jan. 24, 1990

Related U.S. Application Data

[63] Continuation of Ser. No. 159,400, Feb. 23, 1988, abandoned.

[30] Foreign Application Priority Data

Feb. 24, 1987 [ES] Spain ................ 8700488

[51] Int. Cl.$^5$ ................ C08F 2/20
[52] U.S. Cl. ................ 526/201; 526/320; 526/318.42; 524/556
[58] Field of Search ........... 526/320, 201, 318.42; 524/556

[56] References Cited

U.S. PATENT DOCUMENTS

| | | | |
|---|---|---|---|
| Re. 27,151 | 6/1971 | Hicks | 526/318.42 |
| 3,311,583 | 3/1967 | Bearden | 526/318.42 |
| 3,957,711 | 5/1976 | Powanda et al. | 526/318.42 |
| 4,210,702 | 7/1980 | Dalibor | 526/320 |
| 4,267,295 | 5/1981 | Gallop et al. | 526/320 |
| 4,271,283 | 6/1981 | Puhk | 526/318.42 |
| 4,293,475 | 10/1981 | Sidi | 526/318.42 |
| 4,504,635 | 3/1985 | Weber, Jr. et al. | 526/320 |
| 4,574,140 | 3/1986 | Sandstrom et al. | 526/320 |
| 4,604,440 | 8/1986 | Wichterle et al. | 526/320 |
| 4,742,121 | 5/1988 | Toman | 526/320 |

FOREIGN PATENT DOCUMENTS

| | | | |
|---|---|---|---|
| 0197460 | 10/1986 | European Pat. Off. | 526/320 |
| 2327173 | 7/1972 | Fed. Rep. of Germany | 526/320 |
| 2460329 | 7/1976 | Fed. Rep. of Germany | 526/318.42 |
| 3036101 | 4/1982 | Fed. Rep. of Germany | 526/201 |
| 40-13672 | 7/1965 | Japan | 526/201 |
| 55-69635 | 5/1980 | Japan | 526/201 |
| 60-147419 | 8/1985 | Japan | 526/330 |
| 61-247705 | 11/1986 | Japan | 526/330 |
| 1133328 | 11/1968 | United Kingdom | 526/201 |
| 1589873 | 5/1981 | United Kingdom | 526/201 |
| 2124105 | 2/1984 | United Kingdom | 526/320 |
| 2161170 | 1/1986 | United Kingdom | 526/201 |
| 8103334 | 11/1981 | World Int. Prop. O. | 526/201 |

*Primary Examiner*—Joseph L. Schofer
*Assistant Examiner*—N. Sarofin
*Attorney, Agent, or Firm*—Kuhn and Muller

[57] ABSTRACT

Hydroxylated acrylic copolymers in solid form which are the product of the suspension polymerization containing from 1 to 8 carbon atoms in the alcohol chain, hydroxyalkylacrylates or methacrylates, and acrylic or methacrylic acid and contain from 0.5 to 8% free hydroxyl groups and from 0.1 to 5% free carboxyl groups which are capable of reacting with compounds containing reactive groups such as isocyanates or their prepolymers, amines containing—NH—CH$_2$OH— groups or epoxy groups provide improved binders for paints and shellacs used for plastics.

11 Claims, No Drawings

HYDROXYLATED ACRYLIC COPOLYMER BINDER FOR PAINTS

This application is a continuation division of application Ser. No. 159,400, filed 02/23/88 now abandoned.

FIELD OF THE INVENTION

The present invention relates to improvements in hydroxylated acrylic copolymers, particularly applicable as a binder for paints and varnishes, consisting of two components intended for painting or varnishing plastics for automobile parts, household electrical appliances, etc. They are also applicable for powder paints of two components with polyisocyanates blocked over metal surfaces.

BACKGROUND OF THE INVENTION

Two-component systems based on hydroxylated acrylic resins or copolymers and polyisocyanates are already known, and are generally considered most suitable for the process of painting or shellacking plastic materials.

These systems offer many possibilities of adjusting properties such as hardness, flexibility, chemical and physical resistances, etc. Their low crosslinking or drying temperatures make it possible to use them on plastics sensitive to elevated temperatures.

Hydroxylated acrylic resins or copolymers for painting plastics have hitherto been manufactured by solution polymerization, in liquid form, which makes it necessary for the user to partially or completely apply solvents used in the same polymerization. Many of these solvents favor the formation of microfissures on the surface of the painted or shellaced plastic, because the plastic part is sensitive to or caused to swell by the solvent, which may release internal stresses resulting in the formation of such microfissures which, in their turn, lower the mechanical resistance of the plastic and the paint or shellac used.

The internal stresses of the plastic are those formed during the preparation of parts by injection molding, extrusion, or transformation by heat or pressure with their appropriate final cooling.

Solid acrylic resins or copolymers for paints in powder form to date contain crosslinked carboxyl or glycidyl groups, and they crosslink with oxazoline or anhydrous acids. Results with their use likewise are unsatisfactory.

SUMMARY OF THE INVENTION

An objective of the present invention is therefore that of providing improvements in hydroxylated acrylic copolymers which are obtainable in solid form, permitting the use of solvents more suitable for each type of plastic to be coated and which produce, because of the release of solvents, a hardening with polyisocyanate resins very rapidly to provide them with their monomeric composition and their molecular size. In this way, industrial finishing processes are made possible which are superior in rate to those obtained to date with hydroxylated acrylic resins in liquid form.

The hardness of the film and resistance to solvents are likewise very high after brief air-drying times or in a hot-air hardening process, which makes it possible to obtain bottom or prime coats for rapid repainting with good dry sanding properties.

DESCRIPTION OF THE PREFERRED EMPODIMENT

The copolymer in accordance with the present invention essentially contains free hydroxyl and carboxyl groups capable of reacting with compounds having reactive groups such as isocyanates or their copolymers, amine resins containing —NH—CH$_2$OH— groups, or epoxy groups.

Only a small quantity of said groups, namely 0.5 to 8% free hydroxyl groups and 0.1 to 5% free carboxyl groups, are present in their monomeric composition; the latter regulate the gelling rate of the solutions.

Suitable resins can be copolymer of esters of acrylic or methacrylic acid with 1 to 8 carbon atoms in the alcohol chain such as methyl methacrylate and ethylhexyl-acrylate, hydroxyalkylacrylates or methacrylates, and acrylic or methacrylic acid.

The esters of acrylic or methacrylic acid can be partially or completely replaced by styrene, methylstyrene, or vinyltoluene. Acrylic or methacrylic acids themselves may also be completely or partially replaced by other polymerizable acids such as crotonic or itaconic acid. The hydroxyalkylacrylates or hydroxyalkylmethacrylates may also be replaced in whole or in part by glyceryl monomethacrylate.

The procedure that can be used to obtain the hydroxylated acrylic copolymer of the invention in solid form is generally known, i.e., it consists of process of polymerization in suspension, and the equipment for conducting the same is similar to that for emulsion polymerization.

The process begins by loading water in a reactor; dispersing agent or colloid and other components, the mixture of the monomer (20 to 25% of the total load), and an initiator are charged in the order indicated into the reactor. After thorough agitation, the mixture is heated under an inert atmosphere up to the desired initial reaction temperature or until reflux. When the reaction has ended, the watery paste is cooled and is poured into a filter box for filtration. The resin balls or beads obtained are washed, and may be given an optional steam bath; they are then dried in an oven or in a vacuum rotary drier.

The absence of solvents during polymerization, as well as using relatively low temperatures of from 80° to 90° C., are important in acordance with the invention for obtaining hyroxylated acrylic copolymer in solid form, which provides a more uniform molecular size, resulting in superior mechanical and physiochemical properties.

It is also important to use a water-soluble colloid of polyacrylate type in the aqueous suspension, which favors establishment of the suspension during the polymerization.

The liquid hydroxylated acrylic resins available commercially are compared below with the hydroxylated acrylic copolymers resins in solid form obtained according to the present improvements.

Commercially available liquid hydroxylated resins for example, have the following characteristics, according to the manufacturers:

TABLE I

| Resin | % OH on Solids | Acidity index | Solids in % | Solvents composition |
|---|---|---|---|---|
| 1 | 4.6 | —* | 60 | ethylglycol acetate xylene |

TABLE I-continued

| Resin | % OH on Solids | Acidity index | Solids in % | Solvents composition |
|---|---|---|---|---|
| 2 | 4 | —* | 50 | ethylglycol acetate xylene |
| 3 | 1.8 | 18 | 50 | ethylglycol acetate xylene |
| 4 | 3 | —* | 60 | butyl acetate xylene |

*no available data

The crosslinking is achieved with various isocyanate prepolymers available on the market, done according to the ratio:

OH:NCO = 1:1 as indicated by the manufacturers. The drying and crosslinking are carried out at room temperature (20° to 25° C.), and 60% relative humidity, or for 30 minutes at 80° C. in an oven.

On the other hand, the solid hydroxylated acrylic copolymers or resins of the present invention, have the following characteristics:

TABLE II

| Resin | % OH on Solids | Acidity index | Solids in % | Solvents |
|---|---|---|---|---|
| 5 | 2.6 | 13 | 100 | |
| 6 | 3 | 13 | 100 | to be selected |
| 7 | 1.8 | 13 | 100 | |
| 8 | 4 | 13 | 100 | |

The crosslinking is obtained with various isocyanate prepolymers available on the market, done in the ratio:

OH:NCO = 1:1 according to indications from the manufacturers. After the resins have been dissolved in the solvent selected, crosslinking is carried out at room temperature, (from 20° to 25° C.) and 60% relative humidity, or for 30 minutes at 80° C. in an oven.

The isocyanate prepolymers mentioned, used in formulations for the crosslinking of said hydroxylated acrylic resins, both liquid and solid, are:
* Desmodur N 75%, with 17% NCO our of the total (Bayer)
* Desmodur L 75%, with 13% NCO our of the total (Bayer)
** IPDI T 1890 L 70%, with 12% NCO out of the total (Huls)

The NCO values correspond to indications from the manufacturers.

To confirm the results of the crosslinking of the resins, the above mentioned solutions are applied on polished and flat glass panels with a moist film thickness of 100μ, drying in the open air at 20° to 25° C. and 60% relative humidity.

The different hardnesses of these films formed on glass panels were later checked according to the following methods:
Persoz hardness according to standard DIN 53,157.
Pencil hardness according to standard ASTM D 3363.
Resistance to solvents.
Various unstandardized but recongnized methods exist for the latter test, the one used being that of the numbers of single (not double) smearings with hydrophilic cotton completely moistened with the solvents and squeezed.

The scale of resistance to the solvent was set at values of 1 to 5, which represents the degree of attack on the film by the solvent, namely:
1 = unchanged
2 = slight loss of luster
3 = slightly damaged and loss of luster (matted)
4 = complete loss of luster and deep damage
5 = destruction and complete dissolution of the film.

Many tests were carried out as described above with the different formulations of liquid and solid resins. The hardness and solvent-resistance results are presented below:

TABLE III

| | (with Desmodur N) | | | | | | | |
|---|---|---|---|---|---|---|---|---|
| | 1 | 2 | 3 | 4 | 5 | 6 | 7 | 8 |
| Formulations in grs. | | | | | | | | |
| Liquid Resin No. 1 | 27 | | | | | | | |
| Liquid Resin No. 2 | | 33.7 | | | | | | |
| Liquid Resin No. 3 | | | 38.2 | | | | | |
| Liquid Resin No. 4 | | | | 28.6 | | | | |
| Solid Resin No. 5 | | | | | 18.4 | | | |
| Solid Resin No. 6 | | | | | | 18 | | |
| Solid Resin No. 7 | | | | | | | 19 | |
| Solid Resin No. 8 | | | | | | | | 16.2 |
| Xylene | 15 | | 10 | 11.5 | 18.2 | 18 | 18.2 | 18 |
| Methyl Isobutyl Ketone | 14 | 17.8 | 19 | 11.5 | 18.2 | 18 | 18.4 | 18 |
| Ethyl acetate | 28.2 | 30 | 26.1 | 30.6 | 27 | 27.4 | 27.7 | 29.2 |
| Ethyleneglycol Acetate | 4 | 8 | 10 | 10 | 10 | 10 | 10 | 8 |
| Dimethylamino ethanol (10% Tuluol) | 1 | 1 | 1 | 1 | 1 | 1 | 1 | 1 |
| Desmodur N 75% | 10.8 | 9.5 | 5.7 | 7.6 | 7.4 | 7.6 | 5.7 | 9,6 |

TABLE III-continued
(with Desmodur N)

|  | 1 | 2 | 3 | 4 | 5 | 6 | 7 | 8 |
|---|---|---|---|---|---|---|---|---|
| Results |  |  |  |  |  |  |  |  |
| Persoz hardness 3 hours | 43" | 90" | 174" | 33" | 192" | 165" | 123" | 88" |
| Persoz hardness 8 hours | 87" | 156" | 235" | 89" | 230" | 206" | 180" | 156" |
| Persoz hardness 24 hours | 275" | 282" | 285" | 240" | 303" | 250" | 270" | 240" |
| Pencil hardness 3 hours | 5 B | 5B-4B | H B | 5 B | F | B-HB | H B | 4 B |
| Pencil hardness 8 hours | 2 B | B | F-H | 2-B | F-H | F-H | F-H | B-HB |
| Pencil hardness 24 hours | F-H | H B | H | H B | H | H | H | 2 H |
| Resistance to Xylene-100 smears |  |  |  |  |  |  |  |  |
| after 24 hours | 2-3 | 4 | 1-2 | 1 | 1-2 | 1 | 1-2 | 1 |
| after 72 hours | 1-2 | 3 | 1-2 | 1 | 1-2 | 1 | 1 | 1 |
| Resistance to MEK-60 smears |  |  |  |  |  |  |  |  |
| after 24 hours | 4-5 | 4 | 5 | 2-3 | 2-3 | 1-2 | 2 | 1 |
| after 72 hours | 2 | 2 | 2-4 | 1-2 | 2 | 1 | 1-2 | 1 |
| Dried 80°/30 min. |  |  |  |  |  |  |  |  |
| Pencil hardness | F | F | F-H | H-2H | H-2H | 2H-3H | H-2H | 3H-4H |
| Persoz hardness | 263" | 325" | 255" | 232" | 335" | 350" | 315" | 227" |
| Resist. Xylene 100 smears | 1-2 | 2-3 | 1-2 | 1 | 1-2 | 1 | 1-2 | 1 |
| Resist. MEK 100 smears | 2 | 4-5 | 4-5 | 1-2 | 1-2 | 1-2 | 2 | 1 |

TABLE IV
(with Desmodur L)

|  | 1 | 2 | 3 | 4 | 5 | 6 | 7 |
|---|---|---|---|---|---|---|---|
| Formulations in grs. |  |  |  |  |  |  |  |
| Liquid Resin No. 1 | 25 |  |  |  |  |  |  |
| Liquid Resin No. 2 |  | 32 |  |  |  |  |  |
| Liquid Resin No. 3 |  |  | 39.4 |  |  |  |  |
| Liquid Resin No. 4 |  |  |  | 29 |  |  |  |
| Solid Resin No. 5 |  |  |  |  | 18.2 |  |  |
| Solid Resin No. 6 |  |  |  |  |  | 17.5 |  |
| Solid Resin No. 7 |  |  |  |  |  |  | 18.2 |
| Xylene | 13 |  | 10 | 10 | 18 | 18 | 18 |
| Methyl Isobutyl Ketone | 14 | 18 | 14 | 14 | 18 | 18 | 18 |
| Ethyl acetate | 30 | 28 | 28 | 27 | 26.8 | 26.5 | 28.8 |
| Ethyleneglycol Acetate | 4 | 9 | 1 | 9 | 9 | 9 | 9 |
| Dimethylamino ethanol | 1 | 1 | 1 | 1 | 1 | 1 | 1 |
| (10% Tuluol) Desmodur L 75% | 13.3 | 12 | 6.66 | 10 | 9 | 10 | 7 |
| Results |  |  |  |  |  |  |  |
| Persoz hardness 3 hours | 230" | 225" | 234" | * | 264" | 185" | 224" |
| Persoz hardness 8 hours | 295" | 287" | 275" | * | 305" | 255" | 290" |
| Persoz hardness 24 hours | 334" | 353" | 285" | * | 318" | 280" | 320" |
| Pencil hardness 3 hours | F | F | F-H | * | F-H | F H | H |
| Pencil hardness 8 hours | F-H | F | H | * | H | H | H-2H |
| Pencil hardness 24 hours | F-H | F | H | * | 2 H | 2 H | 2 H |
| Resistance to Xylene 100 smears after 48 hours | 1 | 1 | 2-3 | * | 1 | 1 | 1 |
| Resistance to MEK 60 hours after 48 hours | 2-3 | 3-4 | 4 | * | 2-3 | 1-2 | 1-2 |

*gelled in mixture

TABLE V
(with IPDI T 1890 L)

|  | 1 | 2 | 3 | 4 | 5 | 6 | 7 |
|---|---|---|---|---|---|---|---|
| Formulations in grs. |  |  |  |  |  |  |  |
| Liquid Resin No. 1 | 24 |  |  |  |  |  |  |
| Liquid Resin No. 2 |  | 33.7 |  |  |  |  |  |
| Liquid Resin No. 3 |  |  | 38.4 |  |  |  |  |
| Liquid Resin No. 4 |  |  |  | 28.6 |  |  |  |
| Solid Resin No. 5 |  |  |  |  | 18.4 |  |  |
| Solid Resin |  |  |  |  |  | 18.3 |  |

TABLE V-continued

| (with IPDI T 1890 L) | 1 | 2 | 3 | 4 | 5 | 6 | 7 |
|---|---|---|---|---|---|---|---|
| No. 6 Solid Resin | | | | | | | |
| No. 7 | | | | | | | 18.6 |
| Xylene | 15 | | 10 | 10.5 | 18.2 | 18 | 18 |
| Methyl Isobutyl Ketone | 14 | 14.8 | 15 | 11.5 | 18.2 | 18 | 18 |
| Ethyleneglycol Acetate | 4 | 8 | | 10 | 10 | 10 | 10 |
| Tin dibutyl dilaurate with 1% Ethyleneglycol acetate | 0.2 | 0.2 | 0.2 | 0.2 | 0.2 | 0.2 | 0.2 |
| Ethylacetate | 27 | 30 | 29.3 | 30.6 | 25.7 | 23 | 27.7 |
| IPDI-T 1890 L (HULS) | 16 | 13.4 | 7.14 | 9.35 | 9.3 | 12.5 | 7.5 |
| Results | | | | | | | |
| Persoz hardness 3 hours | 205" | 185" | 210" | 48" | 225" | 195" | 217" |
| Persoz hardness 8 hours | 265" | 247" | 226" | 155 | 242" | 225" | 256" |
| Persoz hardness 24 hours | 320" | 340" | 295" | 175 | 315" | 280" | 300" |
| Pencil hardness 3 hours | 2B | B | HB | 4 B | HB | B-Hb | HB |
| Pencil hardness 8 hours | B | B | HB-F | B | F | HB | F |
| Pencil hardness 24 hours | HB | HB | F | HB | H-2H | F | H |
| Resistance to Xylene 100 smears | | | | | | | |
| after 24 hours | 3 | 3–4 | 4 | 2 | 2 | 1–2 | 1–2 |
| after 96 hours | 2–3 | 3 | 3–4 | 1–2 | 1–2 | 1–2 | 1 |
| Resistance to MEK 60 smears after 24 hours | 5 | 5 | 5 | 5 | 5 | 5 | 2 |
| after 96 hours 100 smears | 4–5 | 5 | 5 | 5 | 4 | 4–5 | 1–2 |

In summary, it can be inferred from the foregoing tables of hardness and solvent-resistance results that the following advantages are obtained with the use of the hydroxylated acrylic copolymers or resins in solid form of the present invention:

a) The same or better results are obtained with a lower content of free hydroxyl groups in crosslinked films that with liquid hydroxylated acrylic resins containing a greater quantity of free hydroxyl groups in their monomeric composition.

b) Less consumption of isocyanates and amine or epoxy resins.

c) With the same content of free OH groups in the hydroxylated copolymer in solid form as in the liquid hydroxylated resins, greater resistances to solvents are obtained after crosslinking the solid copolymer or resin.

d) With equal contents of free hydroxyl groups, the resistance to scratching (surface hardness) is much greater for the hydroxylated copolymer in solid form than with the liquid resin, following crosslinking.

e) With the use of the hydroxylated copolymer in solid form mixed with polyisocyanates, because the latter have a high molecular weight, the drying time of the painted or shellaced coating is shortened, being reduced to about one-half or one-third the time.

f) Their hardness is from 3H to 4H with the drying of said coatings by hot air at 80° C. for 30 minutes.

g) With the drying of said coatings by hot air at 80° C. for 30 minutes, and also because of the high molecular weight of the hydroxylated resin in solid form used, the resistance of the former to solvents is much greater.

The application and principles of the invention having been described, it should be understood that same can be carried out in other ways within the framework of the following claims.

What is claimed is:

1. An improved method of preparing hydroxylated acrylic copolymers especially applicable as a binder for paints and shellacs, and containing free hydroxyl and carboxyl groups capable of reacting with compounds having reactive groups selected from isocyanates or their prepolymers, amine resins containing —NH-CH$_2$OH—, or with epoxy groups, which comprises polymerizing unsaturated alpha olefin and substituted alpha olefin monomers by suspension polymerization in an aqueous media which includes a water-soluble polyacrylate colloid as a suspension stabilizer during polymerization until a solid copolymer reaction product forms and recovering the copolymer reaction product in solid form, wherein the free hydroxyl groups and free carboxyl groups in said reaction product are contained in respective proportions of 0.5 to 8 percent and 0.1 to 5 percent.

2. The improved method in accordance with claim 1, wherein said unsaturated alpha olefin monomers are esters of acrylic or methacrylic acid having 1 to 8 carbon atoms in the alcohol chain, hydroxyalkylacrylates or methacrylates, acrylic acid or methacrylic acid.

3. The improved method in accordance with claim 2 which includes replacement at least a portion of said esters of acrylic or methacrylic acid monomers by styrene, methylstyrene, or vinyltoluene.

4. The improved method in accordance with claim 2, which includes replacement of at least a portion of said acrylic or methacrylic acid monomers with crotonic or itaconic acid.

5. The improved method in accordance with claim 2, which includes replacement of at least a portion of the hydroxyalklylacrylates or hydroxyalkyl metharcrylate monomers with glyceryl monmethacrylate.

6. An improved method of preparing paint and shellac suitable for use as a coating for plastics which comprises providing paint and shellac formulation components and incorporating therein as a binder component for said paint and shellac a hydroxylated acrylic copolymer in solid form containing free hydroxyl groups in the proportion of from about 0.5 to 8.0 percent and free carboxyl groups in the proportion of from about 0.1 to 5 percent suitable for reacting with compounds having reactive groups selected from isocyanates or their prepolymers, amine resins containing —NH-CH$_2$OH— groups or epoxy groups.

7. The improved method according to claim 6, wherein said hydroxylated acrylic copolymer is prepared by suspension polymerization in an aqueous media from which said copolymer is recovered in solid form.

8. The improved method according to claim 6, wherein said acrylic copolymer is the polymerization product of ester of acrylic or methacrylic acid with 1 to 8 carbon atoms in the alcohol chain, hydroxyalkyl acrylates or methacrylates, and acrylic or methacrylic acid.

9. Hydroxylated acrylic copolymers in solid form containing from about 0.5 to 8% of free hydroxyl groups and from about 0.1 to 5% of free carboxyl groups which are the solution polymerization product of unsaturated monomers containing an alpha olefin double bond.

10. The solid hydroxylated acrylic copolymers according to claim 9, which are the product recovered from the suspension polymerization in aqueous media, said suspension polymerization including a water-soluble polyacrylate colloid as a suspension stabilizer during polymerization.

11. The improved method according to claim 8, wherein said acrylic copolymer is the product obtained from suspension polymerization in an aqueous media in the presence of a water-soluble polyacrylate colloid suspension stabilizer.

* * * * *